United States Patent [19]
Parri

[11] Patent Number: 5,988,722
[45] Date of Patent: Nov. 23, 1999

[54] SLIDING VEHICLE STORAGE SYSTEM

[76] Inventor: Michael A. Parri, 2989 Meadow Run Rd., Bear Creek Twp., Wilkes-Barre, Pa. 18702

[21] Appl. No.: 09/060,310

[22] Filed: Apr. 15, 1998

[51] Int. Cl.[6] ....................................................... B60R 9/00
[52] U.S. Cl. ........................ 296/26.09; 224/403; 414/522
[58] Field of Search ............................. 296/26.08, 26.09, 296/37.6; 224/401–403; 414/522

[56] References Cited

U.S. PATENT DOCUMENTS

| | | | |
|---|---|---|---|
| 3,471,045 | 10/1969 | Panciocco | 296/37.6 |
| 5,088,636 | 2/1992 | Barajas | 296/37.6 |
| 5,509,709 | 4/1996 | Carroll | 296/26.09 |
| 5,593,201 | 1/1997 | Baterman | 296/39.2 |

*Primary Examiner*—Dennis H. Pedder
*Attorney, Agent, or Firm*—Breiner & Breiner

[57] ABSTRACT

A sliding vehicle storage system is described for mounting on two opposing interior side walls of a vehicle. The storage system provides for a platform slidingly received in a vehicle which may be positioned at different heights in relation to the side walls of a vehicle to provide versatility in use. The storage system includes, in relation to each of two opposing interior side walls, mounting means attached to a support assembly. Each support assembly includes a mounting plate connected to an outer track assembly including a plurality of wheel bearings held operatively in place within the outer track assembly, and a locking plate. An inner track assembly slidingly mates with the outer track assembly. A cross member support is connected to the inner track assembly. Extending between the two inner track assemblies upon the two opposing vehicle side walls are at least two cross members supported by the cross member support of each opposing support assembly. A platform is supported by the at least two cross members. A locking assembly is present in relation to the sliding platform structure. The locking assembly operates in conjunction with the locking plate to selectively lock or unlock the platform in one or more predetermined positions. The sliding storage apparatus is readily installed within storage areas of various sizes and provides multiple accessible storage areas within a vehicle to accommodate storage of variously sized items.

25 Claims, 5 Drawing Sheets

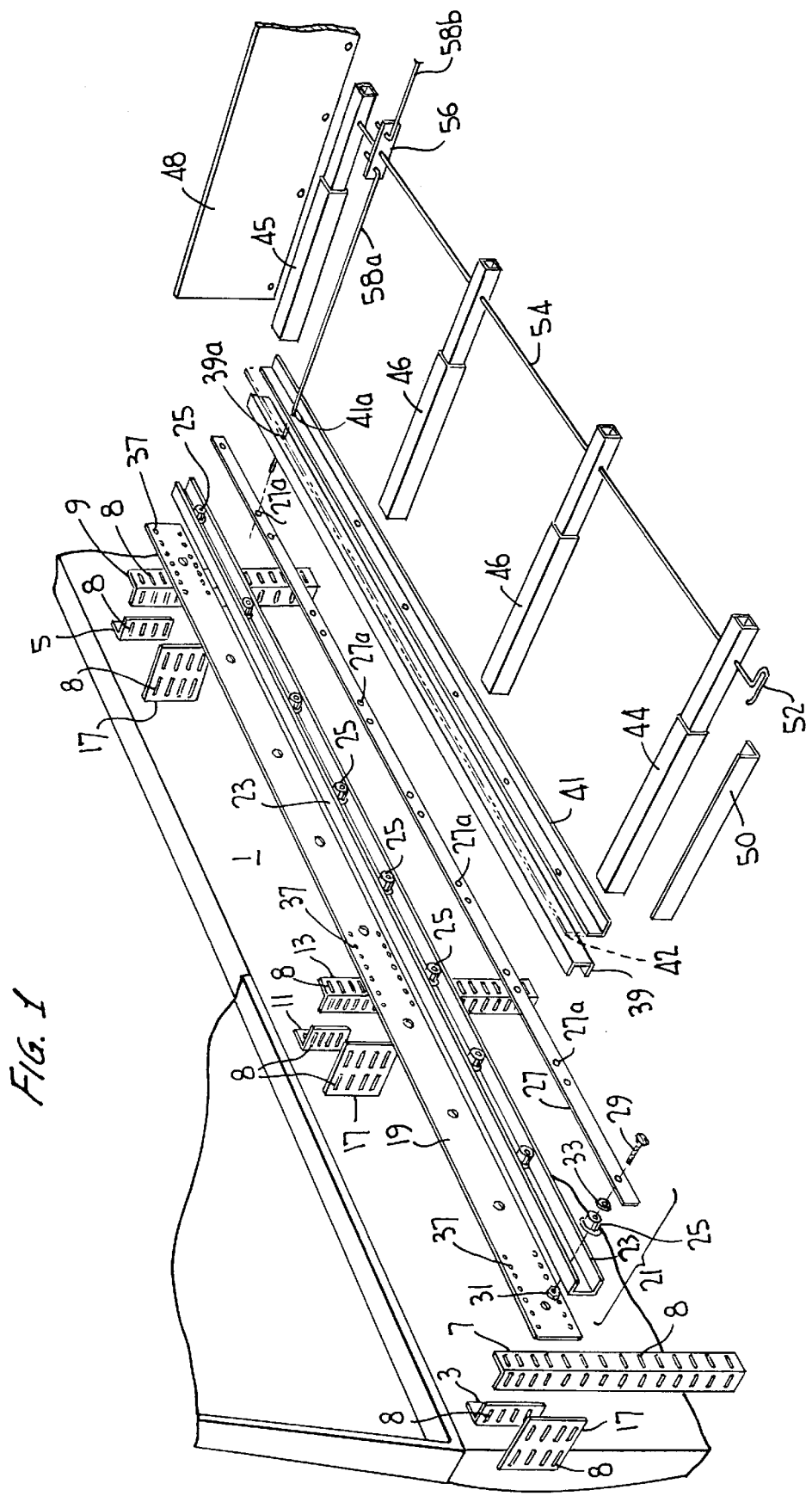

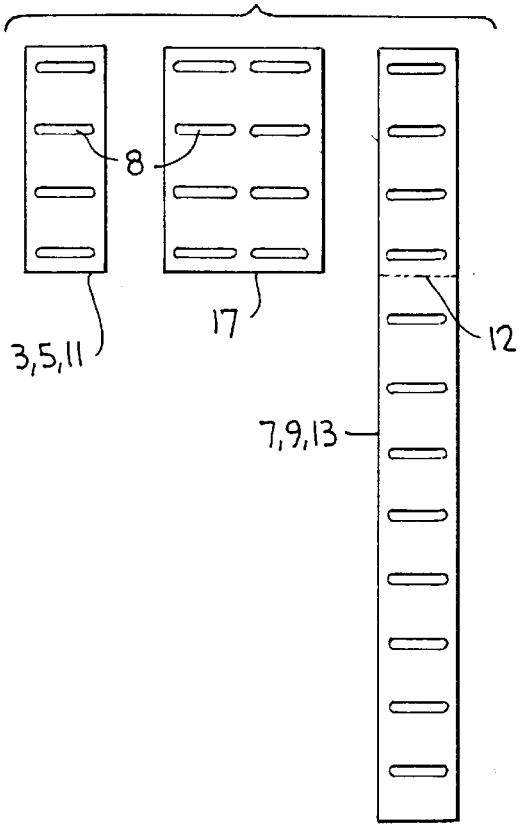
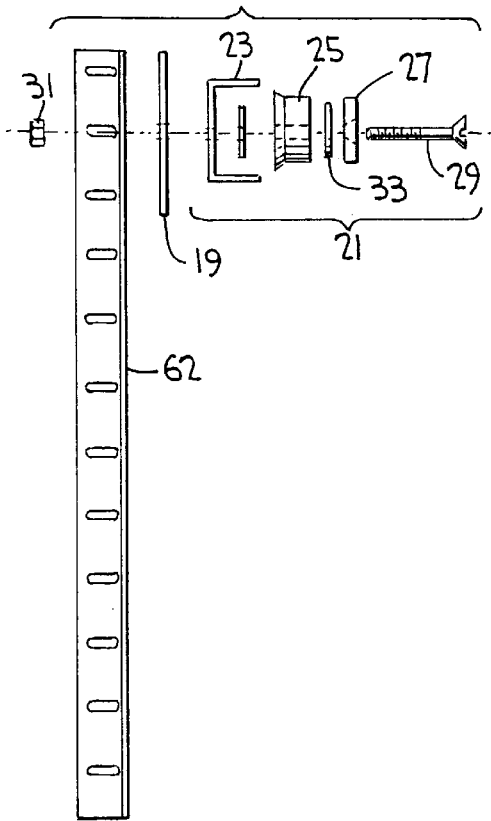
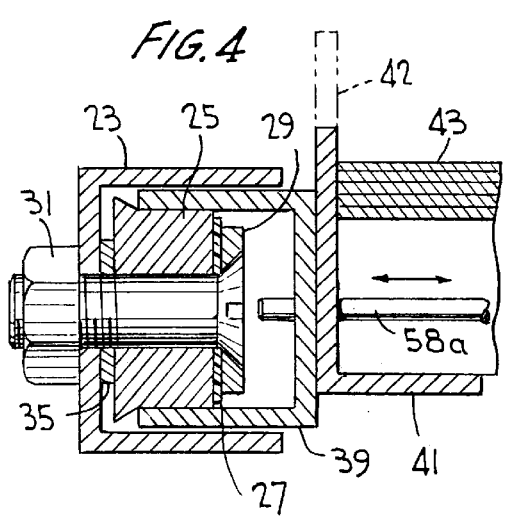
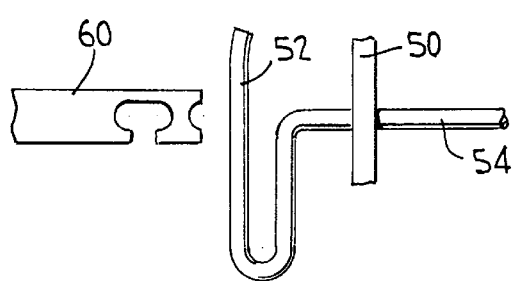
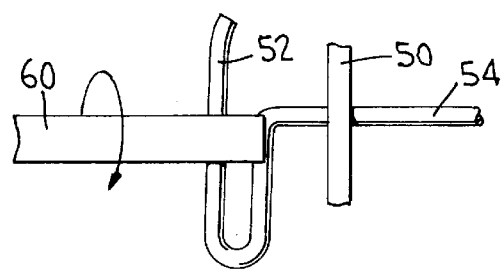

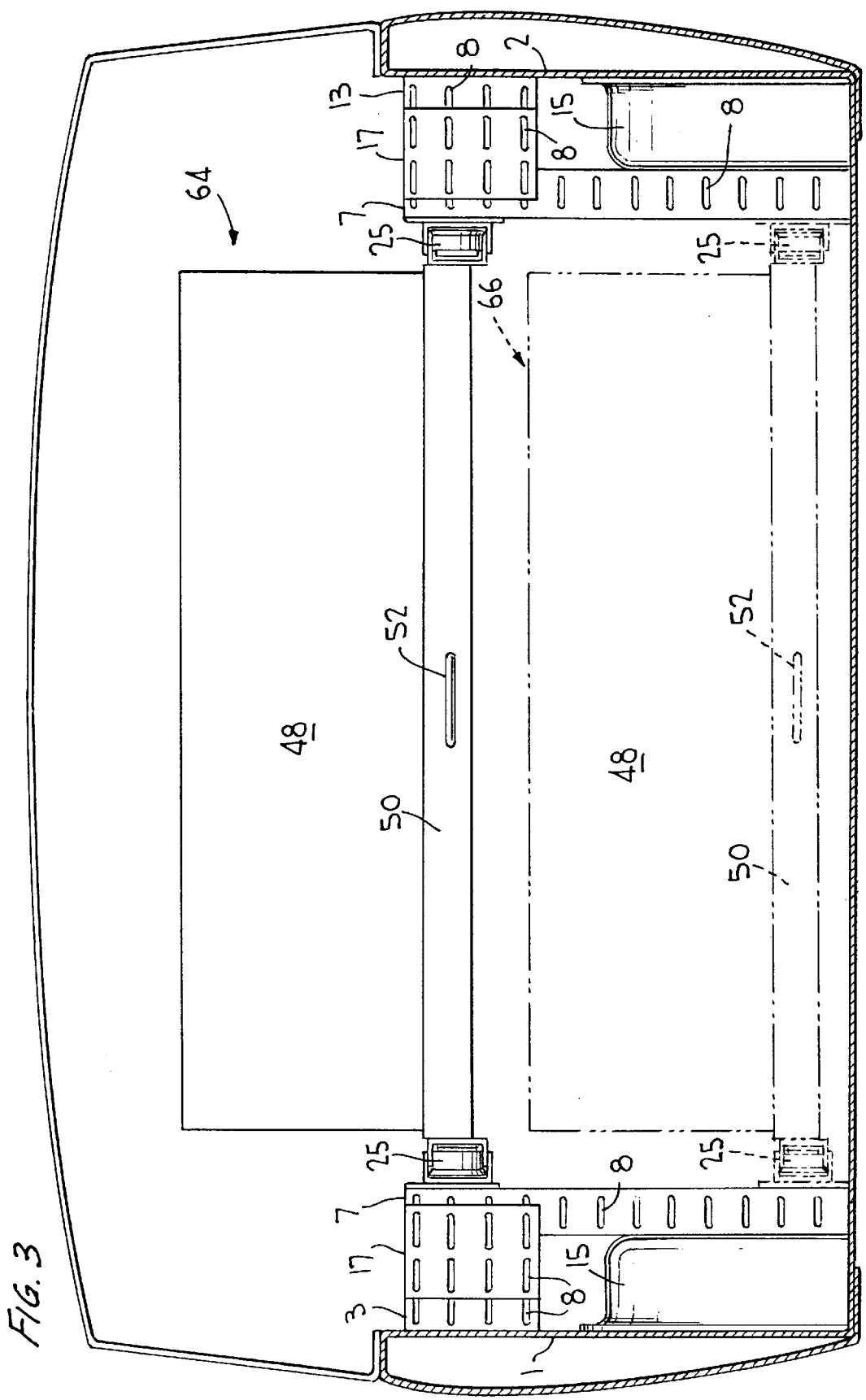

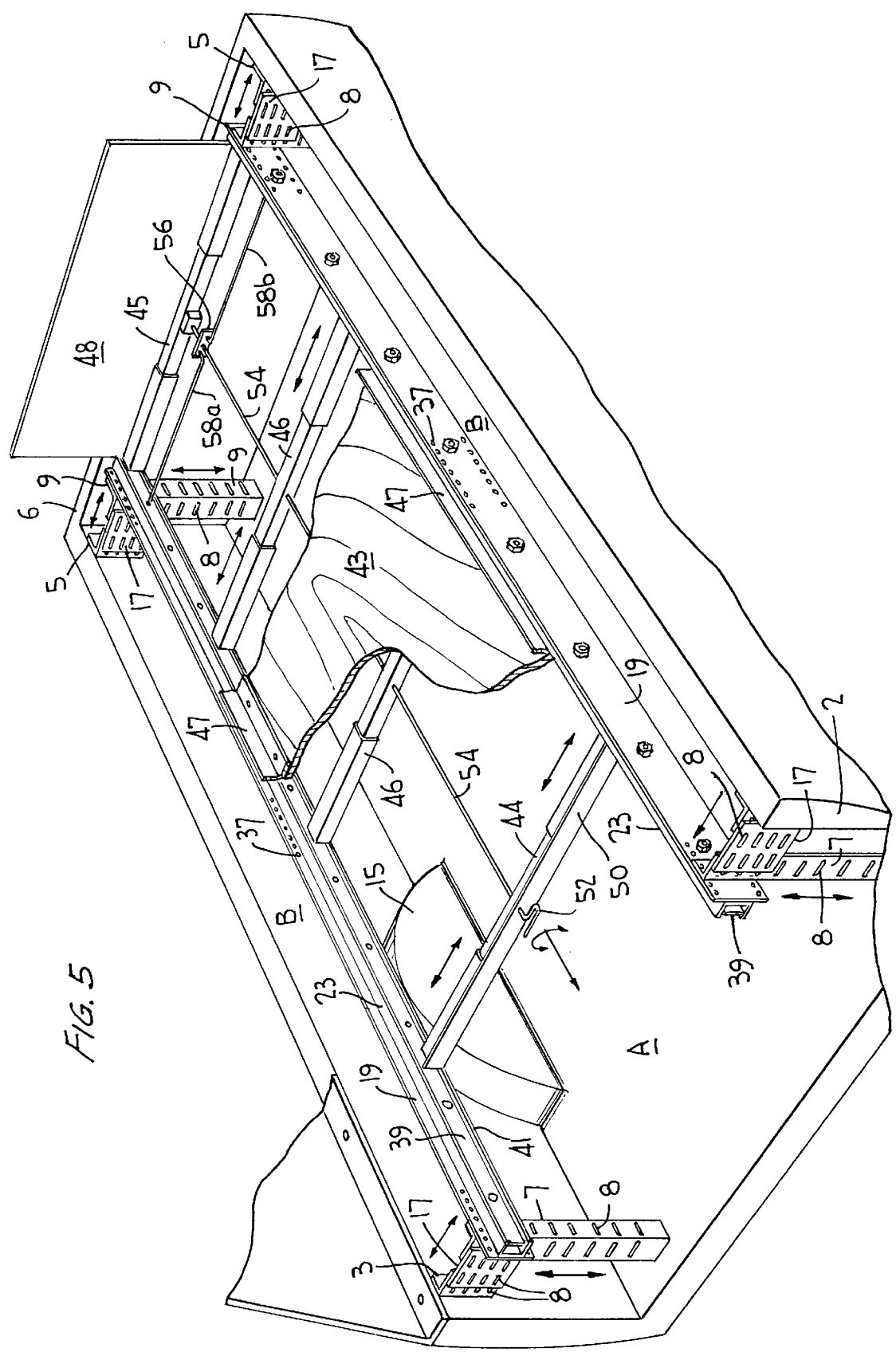

SLIDING VEHICLE STORAGE SYSTEM

FIELD OF THE INVENTION

The invention is directed to a sliding storage system for use in an interior storage area of a vehicle, such as a pick-up truck, van, sports utility vehicle or the like. The sliding storage system is attached to two opposing interior side walls of a vehicle and includes a platform which can slide in and out, partially or wholly, of the vehicle. The sliding storage system of the invention allows for versatility in installation and use.

BACKGROUND OF THE INVENTION

Various storage systems for beds of pick-up trucks are known in the art. Such devices generally are attached to the floor of the truck bed or, if attached to a side wall of a truck bed include a depth to the floor to provide a storage box structure. Examples of storage devices known in the art are described briefly below.

U.S. Pat. No. 4,635,992 describes, as shown in FIGS. 1 and 2, a storage box slideably suspended on rails attached to the upper inside side walls of a truck bed.

U.S. Pat. No. 4,522,326 describes a tool box which rolls along rails attached to the upper inner side walls of a truck bed.

U.S. Pat. Nos. 5,037,153 and 5,121,959 each describe a storage box moveable along guide rails attached to the top of side walls of a truck bed. Each of the '153 and '959 patents describe particular structures for the mounting assembly which also allows for movement of the storage box.

U.S. Pat. No. 5,509,709 describes an attachment for a pick-up truck bed which includes a slideable platform attached to the floor of the truck bed, a stationary bed affixed to the top of the side walls of the truck bed, and racks which can be raised or lowered in use to allow for storage upon the bed.

U.S. Pat. No. 4,962,709 describes an auxiliary deck raised off the floor of a vehicle to provide for the transporting of articles or sleeping in the vehicle. The raised deck is supported by legs standing on the floor of the vehicle. Movement of the auxiliary deck is not described.

U.S. Pat. No. 5,064,335 describes a platform in a truck bed movable along guide rails situated with respect to the floor of the truck bed so that the platform moves as the bed floor.

U.S. Pat. No. 2,284,419 describes a storage drawer slideable along guide rails in a storage area of a vehicle. The guide rails and drawer are mounted in relation to the floor of the vehicle.

U.S. Pat. No. 5,454,684 describes a storage box capable of rolling movement within the bed of a utility vehicle through the use of channel guides attached to the floor bed of the vehicle.

U.S. Pat. No. 4,889,377 describes a storage system for a vehicle, such as a panel truck or van, which is suspended from a frame attached to one interior side wall of the vehicle. The frame includes at least two horizontal channels and a sliding carriage for slideably moving storage bins along the frame.

The following patents additionally describe platforms, boxes and the like moveably attached to the bed of a vehicle or serve as a floor of a vehicle:

| | |
|---|---|
| 2,784,027 | 4,752,095 |
| 2,797,828 | 4,824,158 |
| 3,006,487 | 4,830,242 |
| 3,132,755 | 4,841,883 |
| 3,338,620 | 4,993,088 |
| 3,768,673 | 5,052,878 |
| 4,305,695 | 5,098,146 |
| 4,681,360 | 5,513,941 |
| 4,705,315 | 5,564,767 |

None of the prior art structures, however, provide for versatility in attachment or installation and thus the manner of use of the prior art storage systems is limited. For example, the slideable drawers attached to the floor of a vehicle provide for less storage space and do not allow for the use of the floor of the vehicle if the drawer is completely removed since the rails on which the drawer moves remain in place on a floor of the truck. Further, such only provides one storage area and, thus, a full utilization of space is not provided. Storage boxes held behind a truck cab do not provide for ready access or storage for large or odd shaped articles. The present invention is directed to providing a vehicle storage system which overcomes the limitations of the known storage devices.

OBJECTS OF THE INVENTION

Accordingly, a primary object of the present invention is to provide a sliding storage system for a vehicle which allows ready access for loading and unloading as well as versatility in installation so as to be useful with storage areas of variously sized vehicles.

Another primary object of the invention is to provide a sliding vehicle storage system readily customizable to different vehicles, such as capped truck beds, sports utility vehicles, vans, and the like, based on accommodating adjustments in height at which a storage platform is positioned for use and the size of the storage platform so as to allow for the capability of storing long, tall or oddly shaped items while providing ready access to such items.

Another primary object of the invention is to provide a sliding vehicle storage system which upon installation in a vehicle is not connected to the floor of the vehicle so that items are able to be stored on the floor of the vehicle, and so that the storage platform can be easily removed from the vehicle and the vehicle used in a conventional manner without having to remove the attachment or mounting means connected to the vehicle.

BRIEF DESCRIPTION OF THE INVENTION

The invention is directed to a sliding vehicle storage apparatus for attachment or mounting to two opposing interior side walls of a vehicle. The storage apparatus can be readily adapted for installation in a capped bed of a truck, a van, a sports utility vehicle or the like.

The storage apparatus includes at least two brackets for attachment to each one of two opposing interior side walls of a vehicle. Depending on the length of the overall storage apparatus and the support required, one or more additional brackets may be utilized to provide further support. Attached to each bracket is a support leg. The support leg can be of a length approximately matching that of the bracket or can be of an extended length to allow for further adjustability in the height of a storage platform or the installation of more than one storage platform. If the support leg is extended and height adjustment is not desired, the added length of the support leg can be cut off.

Attached to the support legs of each of the two opposing side walls is at least one support assembly. Each support assembly includes a mounting plate extending the desired length of the storage area. The storage apparatus may extend the entire length of the interior vehicle storage area or may extend over any predetermined portion of the storage area length depending upon the use requirements desired. The mounting plate is in turn attached to an outer track assembly including a plurality of wheel bearings operatively held in place within the outer track assembly, and a locking plate containing a plurality of spaced holes for use in conjunction with a locking assembly described further below. An inner track assembly is provided which slidingly mates with the outer track assembly such that the locking plate is positioned between the inner track assembly and the remainder of the outer track assembly. A cross member support is connected to the inner track assembly. The cross member support may be made as a separate component and attached to the inner track assembly or, alternatively, the cross member support can be made integral with the inner track assembly to provide a unitary component.

Extending between the two opposing support assemblies attached to the two opposing interior vehicle side walls are at least two cross members supported by each of the cross member supports of the two opposing support assemblies. A storage platform sits on top of and is thus supported by the cross members. The number of cross members utilized depends upon the length of the platform of the sliding storage system. Necessarily, as the length of the platform is extended, additional cross members are utilized to provide for adequate support based upon the weight of the platform and possible storage uses. The storage platform slides in and out, partially or wholly, of the vehicle storage area by movement of the inner track assembly in relation to the stationary outer track assembly.

A locking assembly is present in relation to the storage apparatus in order to maintain the sliding storage platform in one or more alternative predetermined positions in the vehicle or to allow for sliding of the platform in relation to the support assemblies. Preferably, the locking assembly is constructed and arranged to allow for a plurality of predetermined positions wherein the platform can be locked, i.e., in a storage position totally within the vehicle or at various predetermined positions for when the platform is slid partially out of the vehicle to provide access to different areas of the platform. This is desired so that if the vehicle is parked on an incline, i.e., on a hill or the like, than the platform can be locked in a given position to provide for a versatile and safe use.

Preferably, a front guard panel is attached to the forwardmost end, with respect to the vehicle, of the platform or the forwardmost cross member to act as a stop or guard against movement of an article or articles stored on the platform from moving forward in the vehicle beyond a predetermined point. Further, side guards can be provided along each side of the platform to prevent movement off of the platform by articles stored on the platform. Side guards preferably extend about 1 to 2 inches above the top surface of the platform. Additionally, a back cover plate is preferably present on the opposite end of the platform or rearwardmost cross member to provide a finished end and additional support. The back cover plate provides a smooth surface which is aesthetically pleasing and which serves to prevent articles from being caught on the platform structure. The back cover plate can be sized to extend above the top surface of the platform to also serve as a stop guard to articles stored on the platform.

The various components of the sliding vehicle storage apparatus can be made of metal, such as aluminum or an aluminum alloy; a plastic having sufficient strength to serve the required support needs; or a combination of metal and plastic components. When made of metal, most of the components will be separate components and joined together in a conventional manner, such as by using nuts and bolts or the like. When made of plastic, certain components can be made, such as by casting or extrusion, as unitary pieces. For example, the inner track assembly and cross member support can be a single unitary piece, and the mounting plate and the outer track assembly can be a single unitary piece.

In an alternative embodiment, an extension plate can be interposed between the brackets and support legs as attached to one or both side walls so as to accommodate narrower storage areas or interior wheel wells present in the storage area. In a further alternative embodiment, rather than using a bracket, support leg and optional extension plate at the forwardmost wall of the storage area, a single extended length bracket can be used which is mounted directly to the front wall of a truck bed or other interior support surface.

In use, when the support assemblies are attached to the two opposing interior side walls at an approximate mid point of the side walls, for example to the top of a truck bed's inner side walls or a lower portion of a cap for a truck bed, storage is available beneath the sliding platform as well as on top of the storage platform thereby allowing for full usage of the vehicle storage area. The space beneath the platform is especially useful for storing long items such as a ladder, plywood sheets or other building materials, bicycle, tent, or the like. No attachment means are present on the floor of the vehicle storage area and, thus, no restriction is present on movement of articles into and out of this space.

To provide for further versatility, the sliding platform can extend over only a portion of the length of the vehicle storage area to allow for storage of taller items in the area not including the platform as well as provide multiple levels for storage of other articles on top of and below the platform. Thus, a plurality of different sized storage areas are provided.

Additionally, the support assemblies provide sufficient support so that the rear end of the storage platform can be utilized in the manner of a work bench, for example for supporting a vise or the like. This use is especially convenient when the platform is only slid partially out of the vehicle and locked in place at that point.

In a further embodiment, when an extended support leg is utilized, two sets of two opposing support assemblies with corresponding cross member supports and platforms can be utilized to provide for a dual sliding platform storage system.

Accordingly, the sliding vehicle storage apparatus of the present invention is versatile in use and installation without any significant structural modification or disassembly of the components.

BRIEF DESCRIPTION OF THE DRAWINGS

FIG. 1 is a partial perspective exploded view of one half of the sliding vehicle storage apparatus of the invention for installation in a capped truck bed. The other half is a mirror image of like components.

FIG. 2a is an exploded side view of mounting means for the storage system including a bracket, optional extension plate and support leg.

FIG. 2b is an optional front wall mounting means including an L-shaped extended length bracket.

FIG. 3 is a rear view looking into the interior of a capped truck bed illustrating preferred positioning of a sliding vehicle storage system as well as the positioning of an optional second sliding storage system therewith.

FIG. 4 is a detailed cross-sectional view of an outer track assembly, inner track assembly, cross member support, and locking rod.

FIG. 5 is a perspective view of the sliding storage system installed in a capped truck bed illustrating points of adjustment with regard to height and width for various components and thus for the sliding storage apparatus within a vehicle storage area.

FIGS. 6a and 6b illustrate an extension rod and its use with a handle of a locking assembly used to lock or unlock the sliding platform in one or more positions.

DETAILED DESCRIPTION OF PRESENTLY PREFERRED EMBODIMENTS

Figure 7:
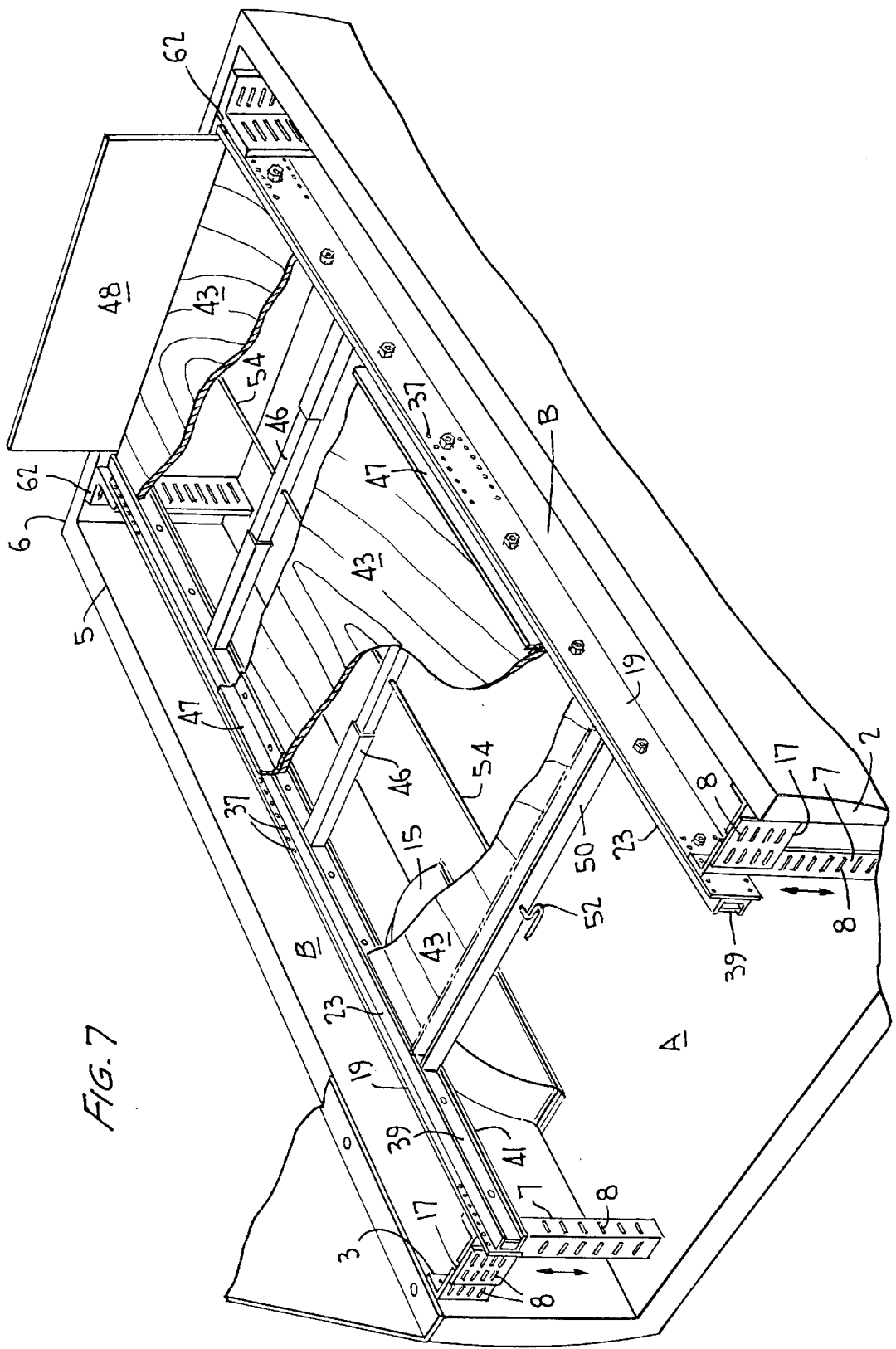
FIG. 7 illustrates a perspective view of the sliding storage system of FIG. 5 showing variations as to the attachment of the front panel, forwardmost (in relation to the front of the vehicle) bracket placement, and rear panel.

The sliding vehicle storage apparatus of the present invention is constructed and arranged for attachment to two opposing interior side walls of a vehicle. The vehicle can be any vehicle with a storage area having side walls suitable for acting as a support surface, such as side walls in the bed of a truck, a van, a sports utility vehicle or the like. With regard to a capped truck bed, the interior side walls are understood to be either the side walls of the truck bed itself or the side walls of the cap. If the side walls of a cap are utilized, the cap must necessarily be made of a material having sufficient strength to support the storage apparatus in the manner of intended use. Accordingly, the cap is preferably made of metal to provide for maximum support. The sliding storage apparatus is shown in use in relation to a capped truck bed in FIGS. 1, 3 and 5. This is an illustrative use as to one vehicle and use in other vehicles in a like manner is possible. Thus, the present invention is not to be limited thereby.

FIG. 1 illustrates an exploded view of the components of a preferred embodiment of the sliding storage apparatus. FIG. 5 illustrates the components as installed for use. The embodiment illustrated shows the attachment or mounting components of the storage apparatus as having a length extending the entire length of the truck bed body. The length of the storage platform in the illustrated embodiment, as best shown in FIG. 5, extends over only a portion of the entire length of the truck bed, thereby leaving space A wherein tall items can be stored. The length of the overall storage apparatus or of the sliding platform can be varied to cover any portion or the entire length of the storage area of a vehicle depending upon the storage capabilities desired by the user. For example, when the sliding platform extends the entire length of the storage area, such allows for easy storage of long items underneath the storage platform as well as storage of any sized items on top of the platform. Alternatively, when the platform only extends for a portion of the storage area, items can be stored under or on top of the platform as well as in the area A between the end of the platform and the end of the vehicle as shown in FIG. 5 and described above.

The preferred embodiment of the sliding storage apparatus will now be described with variations further described below.

The sliding storage apparatus is connected to two opposing interior side walls 1 and 2 of a vehicle utilizing at least two brackets 3 and 5 with respect to each side wall. Each bracket has a support leg 7 and 9 respectively, attached thereto. The brackets are preferably L-shaped, with one leg of the "L" being attached to the side wall and the other leg being attached to a support leg. Depending upon the length of the storage system and the support required, additional brackets 11 and support legs 13 can be utilized. If an interior wheel well 15 is present in the vehicle storage area, or if side space B is desired for any reason, an extension plate 17 can be utilized to join brackets 3 and 5 with support legs 7 and 9. Each bracket, support leg and, when utilized, extension plate includes a plurality of openings 8 therein to allow for variation in positioning with respect to each other and other components of the storage apparatus which are attached to the support legs as further described below. FIG. 2a illustrates a bracket, optional extension plate and extended length support leg suitable for use in the invention. Support legs 7, 9 and 13 can extend from the point of attachment on the interior side walls to the floor of the vehicle storage area to provide for a range of positions for securing support assemblies and platform to the support legs. If such a range of positions is not desired and adequate support is provided by the number of brackets and support legs present, the support legs can be made of a shorter length or cut off, such as at cut line 12 shown in FIG. 2a, to the desired length which thereby provides for total free access to the area present beneath the storage apparatus.

Extending between and attached to each support leg 7, 9 and 13 is a mounting plate 19. Mounting plate 19 includes a plurality of openings 37 to allow for a connector, such as a bolt and nut, to join the support legs and mounting plate. Connected to mounting plate 19 is an outer track assembly 21 which preferably includes a C-shaped -a track or rail 23, a plurality of wheel bearings 25 operatively held within track 23, and a locking plate 27 for operative use with a locking assembly further described below. The mounting plate 19 can be formed as a separate component or made integral with the outer track assembly 21. The outer track assembly 21, including locking plate 27, and mounting plate 19 are preferably connected together by one connection means such as screw 29 and bolt 31 with appropriate washers 33 and 35.

Attached in turn to the outer track assembly 21 is an inner track assembly 39. The outer track assembly 21 is stationary with respect to the mounting or support structure of the brackets, support legs and optional extension plates while inner track assembly 39 is structured to slide along bearings 25 and, thus, provide for sliding of a storage platform 43. Storage platform 43 can be made of any suitable rigid support material, such as plywood, metal or the like. Preferred from the standpoint of cost and ease in workability are plywood sheets. The storage platform is supported in relation to the inner track assemblies 39 by cross member supports 41. Cross member supports 41 can be separate components attached to inner track assemblies 39 by conventional means or, alternatively, each cross member support 41 can be formed integral with an inner track assembly 39 to provide a unitary component. Further support for the platform 43 is provided between the cross member supports 41 by at least two cross members 44 and 45. The cross members extend between and are supported by the cross members 41 present in relation to each side wall apparatus structure. Additional cross members 46 can be utilized depending upon the length of the platform and the support required. Cross members 44, 45 and 46 preferably are telescoping members so that the width can be readily adjusted to fit the vehicle storage area into which the storage apparatus is installed. Platform 43 thus sits atop cross members 44, 45 and 46 which are in turn supported by cross member supports 41. The platform 43 slides due to inner track assembly 39 riding on bearings 25 of the outer track assembly 21.

Preferably present in relation to the sliding platform structure is a front guard panel 48 which can be attached to either the forward end (with respect to the vehicle) of platform 43 (as shown in FIG. 7). or, preferably, the forwardmost cross member 45 (as shown in FIG. 5). The front guard panel serves to stop any forward motion of an article or articles stored on top of platform 43 so that they do not move into another section of the vehicle or damage the vehicle interior. Further, side guards, such as 47 in FIG. 5 or 42 in FIGS. 1 and 4, can be present along the sides of platform 43 to stop sidewise movement off platform 43 by articles stored on platform 43. The side guards need extend only at least about 1 to 2 inches above the top surface of platform 43. The side guard can be an extension of the upright leg of cross member support 41 as indicated by dotted lines 42 in FIGS. 1 and 4. Alternatively, the side guards can be an L-shaped angle attached to the underside or top of platform 43 so that one leg of the L-angle extends up at least about 1 to 2 inches higher than the top surface of platform 43. An L-shaped angle is preferred over a straight sheet material attached to the side wall of platform 43 since added strength will be provided by the support of one leg of the "L" on platform 43. Additionally, a back cover plate 50 is preferably attached to the rear end of platform 43 or, alternatively, preferably to the rearwardmost cross member 44. The back cover plate serves to cover the cross member and platform end to provide for a smooth unitary surface which is both aesthetically pleasing and provides for safety in that the smooth surface covers surfaces on which items may be snagged or caught. The back cover plate can also extend higher than the top surface of platform 43 (as shown in FIG. 7) to serve as a stop guard similar to front panel 48 or side guards 47 or 42.

The sliding storage apparatus is also preferably provided with a locking assembly so that the sliding platform can be locked in place when stored within the vehicle so as to prevent motion of the platform during operation of the vehicle. Additionally, such locking assembly is desired so that if the vehicle is parked on an incline, the platform can be maintained in a desired stationary position during loading or unloading of the platform, or use of the platform as a work bench. In that regard, the locking assembly is preferably constructed and arranged to provide for a plurality of different predetermined positions at which the platform can be locked so that the platform can be locked in a totally inward stored position, a plurality of partially slid out or extended positions or a totally slid out position.

A preferred embodiment of the locking assembly includes a handle 52 including integral therewith, or connected thereto as a separate component, a handle rod 54 which extends through aligned openings present in cross members 44, 45 and 46. A connector component 56 is present to receive handle rod 54 and to which at least one locking rod 58a and/or 58b is preferably connected. Two locking rods are preferably present to provide for additional and a balanced holding strength. Each locking rod 58a and 58b extends towards one of the two opposing interior side walls and is of a length which extends through opening 41a in cross member support 41 and opening 39a in inner track assembly 39, as well as when handle 52 is turned in one direction, will extend through an opening 27a in locking plate(s) 27. When so extended, locking plate(s) 27 together with the locking rod(s) serve to lock the sliding platform in place based on the position of the aligned opening in locking plate(s) 27. Preferably, a plurality of aligned openings 27a, shown in FIG. 1, are provided to allow for a number of predetermined positions at which locking of the sliding platform may be provided. This will accommodate the sliding platform when it is fully forward within the vehicle storage area, partially slid out or extended from the storage at one or more locations, or fully extended out of the vehicle storage area. When the handle 52 is turned in an opposite direction, locking rods 58a and 58b move in an opposite direction so as to be retracted out of an opening in locking plate(s) 27. Locking rods 58a and 58b are always inserted through openings 41a and 39a since this is part of the sliding platform structure. Locking plate 27 is stationary as being part of the stationary outer track assembly 21.

When the sliding platform does not extend the entire length of the storage area of the vehicle, an extension rod 60 as illustrated in FIGS. 6a and 6b can be utilized to reach handle 52 and thereby rotate the handle to provide for locking or unlocking of the sliding platform structure. Necessarily, depending upon the length of the sliding platform, a user can simply reach in and turn the handle manually.

An alternative embodiment to the bracket and support leg structure as shown in FIG. 2a, with respect to the forward wall 6 of the vehicle storage area, is the use of a bracket 62 as shown in FIGS. 2b and 7. Bracket 62 allows for attachment to the front wall 6 of a truck bed or the like in a more simplified manner as compared to the side wall mounting structure. Bracket 62 can be of extended length so that it can also function as a support leg. If a front wall of sufficient strength is not present, however, the mounting structure as shown in FIG. 2a is readily useful in relation to a vehicle interior side wall.

FIG. 3 illustrates an alternative embodiment wherein support legs 7, 9 and, when present, 13 have an extended length to thereby allow for the attachment and use of multiple track assemblies and sliding platforms and thus provide further versatility in use of the storage system. In addition to a sliding platform being provided at the approximate center level of the vehicle storage area (64 in FIG. 3), second outer and inner track assemblies with a storage platform (66 in FIG. 3) can be provided beneath the first storage platform. The two platforms can be of the same or different lengths. This provides ready access to anything stored under the topmost platform regardless of size.

The structure of the sliding platform, which includes inner track assemblies 39; cross member supports 41; cross members 44, 45 and 46; and platform 43, allow the sliding platform to be readily slid out from the outer track assembly and totally removed from the vehicle thereby allowing the vehicle storage area to again be utilized in a conventional manner. Since the mounting components are attached to the two opposing side walls of the vehicle, nothing is present on the floor of the vehicle which would interfere with the use of such as a conventional storage area.

Preferably, the mounting components of the storage apparatus are made of metal such as an aluminum or aluminum alloy. However, such can also be readily made of a plastic having a sufficient strength to provide the support necessary. Further, a combination of metal and plastic components can be utilized. When made of plastic, certain components may be formed in a unitary manner, such as mounting plate 19 and track 23 of the outer track assembly 21. A unitary structure is also readily possible for cross member support 41 and inner track assembly 39.

Installation is simple since the brackets, extensions plates and support legs are readily inter-changeable and do not require customization based upon the position in which they are installed within a vehicle.

FIG. 5 shows the versatility of the storage apparatus of the invention with regard to customizing or fitting the apparatus to various sized vehicles. Adjustment with regard to width for the platform section is provided by the telescoping cross members 44, 45 and 46. Adjustment as to width is also provided based upon the bracket, extension plate and support leg structure. Adjustment as to height is provided based on the length of the brackets and support legs, and/or the ability to attach the brackets at different height positions along the interior side walls of the vehicle.

Accordingly, the invention provides for a sliding vehicle storage apparatus readily adaptable to variously sized vehicle storage areas while having the ability for variation in length which provides for the provision of multiple storage areas in relation to the sliding platform.

As will be apparent to one skilled in the art, various modifications can be made within the scope of the aforesaid description. Such modifications being within the ability of one skilled in the art form a part of the present invention and are embraced by the appended claims.

It is claimed:

1. A sliding vehicle storage apparatus for attachment to two opposing interior side walls of a vehicle comprising
   (a) at least four brackets, with each bracket being connected to a support leg, wherein at least two brackets of said at least four brackets are attached to each of said two opposing interior side walls of a vehicle;
   (b) at least two support assemblies, with at least one support assembly being attached to each of said two opposing interior side walls by connection to each said support leg which is connected to a respective bracket of said at least two brackets, wherein each support assembly comprises
      (b1) a mounting plate attached to each said support leg connected to said respective bracket of said at least two brackets;
      (b2) an outer track assembly connected to said mounting plate, said outer track assembly including a plurality of wheel bearings held operatively in place within said outer track assembly and a locking plate,
      (b3) an inner track assembly for slidingly mating with the outer track assembly; and
      (b4) a cross member support connected to said inner track assembly;
   (c) at least two cross members supported by each cross member support of two opposing support assemblies;
   (d) a platform supported by said at least two cross members; and
   (e) a locking assembly constructed and arranged to operate in conjunction with the locking plate of at least one of said two support assemblies to selectively lock or unlock said platform in at least one predetermined stationary position.

2. A sliding vehicle storage apparatus for attachment to two opposing interior side walls of a vehicle comprising
   (a) at least four brackets, with at least two of said at least four brackets being connected to a support leg and being attached to each of said two opposing interior side walls of a vehicle, and with two of said at least four brackets being attached to a front wall of said vehicle;
   (b) at least two support assemblies, with at least one support assembly being attached to each of said two opposing interior side walls by connection to each said support leg which is connected to a respective bracket of said at least two brackets attached to said interior side walls and connection to said two of said at least four brackets attached to a front wall, wherein each support assembly comprises
      (b1) a mounting plate attached to each said support leg connected to said respective bracket of said at least two brackets and attached to said two of said at least four brackets;
      (b2) an outer track assembly connected to said mounting plate, said outer track assembly including a plurality of wheel bearings held operatively in place within said outer track assembly and a locking plate,
      (b3) an inner track assembly for slidingly mating with the outer track assembly; and
      (b4) a cross member support connected to said inner track assembly;
   (c) at least two cross members supported by each cross member support of two opposing support assemblies;
   (d) a platform supported by said at least two cross members; and
   (e) a locking assembly constructed and arranged to operate in conjunction with the locking plate of at least one of said two support assemblies to selectively lock or unlock said platform in at least one predetermined stationary position.

3. Sliding vehicle storage apparatus of claim 1 further comprising an extension plate for connecting each said bracket of said at least four brackets to each said support leg.

4. Sliding vehicle storage apparatus of claim 1 wherein at least three brackets are present with respect to each opposing interior side wall.

5. Sliding vehicle storage apparatus of claim 1 or 2 wherein each bracket and each support leg includes a plurality of alignable openings to allow adjustment in height positioning of said mounting plate.

6. Sliding vehicle storage apparatus of claim 1 or 2 wherein said mounting plate and said outer track assembly are one unitary component.

7. Sliding vehicle storage apparatus of claim 1 or 2 wherein said inner track assembly and said cross member support are one unitary component.

8. Sliding vehicle storage apparatus of claim 1 or 2 wherein said at least two support assemblies are made of one of metal, plastic or a combination thereof.

9. Sliding vehicle storage apparatus of claim 1 or 2 wherein said two opposing interior side walls of a vehicle are side walls of one of (a) a bed of a truck, (b) a van, (c) a sports utility vehicle, or (d) a cap on a bed of a truck.

10. Sliding vehicle storage apparatus of claim 1 or 2 further comprising a front guard panel connected to said platform.

11. Sliding vehicle storage apparatus of claim 1 or 2 further comprising a front guard panel connected to a forwardmost, with respect to an interior of the vehicle, positioned cross member.

12. Sliding vehicle storage apparatus of claim 1 or 2 further comprising a back cover plate connected to said platform.

13. Sliding vehicle storage apparatus of claim 1 or 2 further comprising a back cover plate connected to a rearwardmost, with respect to an interior of the vehicle, positioned cross member.

14. Sliding vehicle storage apparatus of claim 12 wherein said back cover plate extends higher than a top surface of said platform.

15. Sliding vehicle storage apparatus of claim 13 further comprising a back cover plate connected to a rearwardmost, with respect to an interior of the vehicle, positioned cross member.

16. Sliding vehicle storage apparatus of claim 1 or 2 further comprising a side guard attached to each lateral side of said platform.

17. Sliding vehicle storage apparatus of claim 15 wherein said side guard is an L-shaped angle member.

18. Sliding vehicle storage apparatus of claim 1 or 2 wherein each said cross member support has a wall portion extending higher than a top surface of said platform.

19. Sliding vehicle storage apparatus of claim 1 or 2 wherein said locking assembly comprises a handle, a handle rod extending through aligned openings in said at least two cross members, at least one locking rod, a connector for operatively connecting said handle rod and said at least one locking rod, wherein said handle and thereby said handle rod are rotatable to cause said at least one locking rod to extend forward or to retract to thereby move into or out of engagement, respectively, with an opening in said locking plate of at least one of said at least two support assemblies.

20. Sliding vehicle storage apparatus of claim 19 wherein said at least one locking rod moves into or out of engagement with each of two opposing support assemblies.

21. Sliding vehicle storage apparatus of claim 1 or 2 wherein each support leg is extended in length and includes a plurality of openings therein to allow for adjustable height attachment of said mounting plate to each support leg.

22. Sliding vehicle storage apparatus of claim 21 wherein each said support leg is made of a cuttable material to allow for removal of a portion of a length of said support leg.

23. Sliding vehicle storage apparatus of claim 1 wherein each support leg is extended in length and includes a plurality of openings therein to allow for adjustable height attachment of said mounting plate to each support leg, and wherein four support assemblies are present with two of said four assemblies being arranged in opposing parallel relationships and attached in an approximate upper half of said two opposing interior side walls, and two of said four assemblies being arranged in opposing parallel relationship and attached in an approximate lower half of said two opposing interior side walls, wherein attachment to a relative position on an interior side wall is determined by a point of attachment of said mounting plate to each support leg, to thereby provide two sliding storage platforms.

24. Sliding vehicle storage apparatus of claim 2 wherein each support leg and each of said two of said at least four brackets are extended in length and include a plurality of openings therein to allow for adjustable height attachment of said mounting plate, and wherein four support assemblies are present with two of said four assemblies being arranged in opposing parallel relationships and attached in an approximate upper half of said two opposing interior side walls, and two of said four assemblies being arranged in opposing parallel relationship and attached in an approximate lower half of said two opposing interior side walls, wherein attachment to a relative position on an interior side wall is determined by a point of attachment of said mounting plate to each support leg and each of said two of said at least four brackets, to thereby provide two sliding storage platforms.

25. Sliding vehicle storage apparatus of claim 2 further comprising an extension plate for connecting each said support leg to each said bracket of said at least two of said at least four brackets attached to said interior side walls.

\* \* \* \* \*